No. 862,464. PATENTED AUG. 6, 1907.
A. W. FRENCH.
OIL CAKE STRIPPING MACHINE.
APPLICATION FILED OCT. 9, 1905.

2 SHEETS—SHEET 1.

Witnesses:
E. A. Vock
R. W. Reuner

Inventor.
Alfred W. French
by Wilhelm, Parker & Hard,
Attorneys.

No. 862,464. PATENTED AUG. 6, 1907.
A. W. FRENCH.
OIL CAKE STRIPPING MACHINE.
APPLICATION FILED OCT. 9, 1905.
2 SHEETS—SHEET 2.
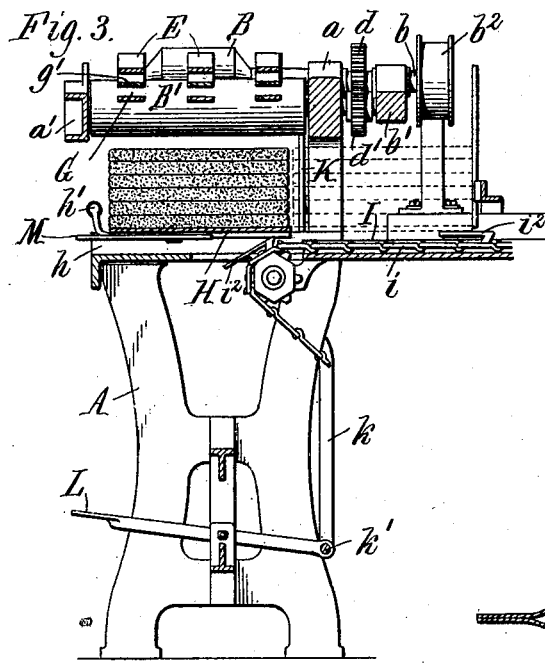
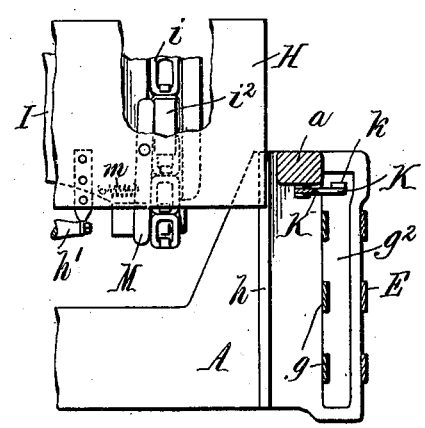
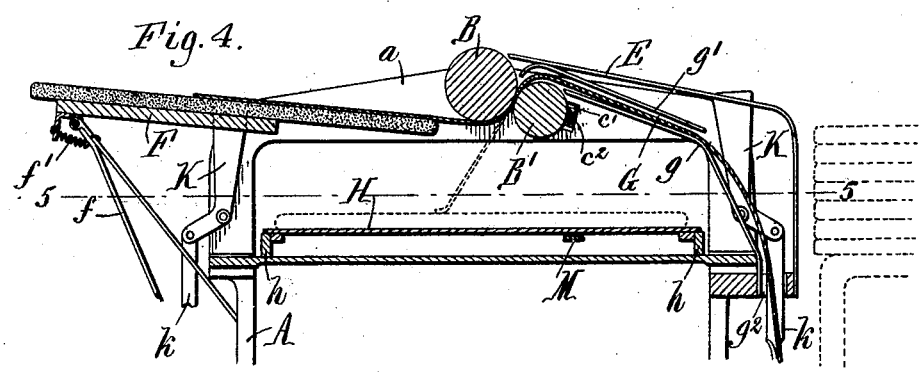
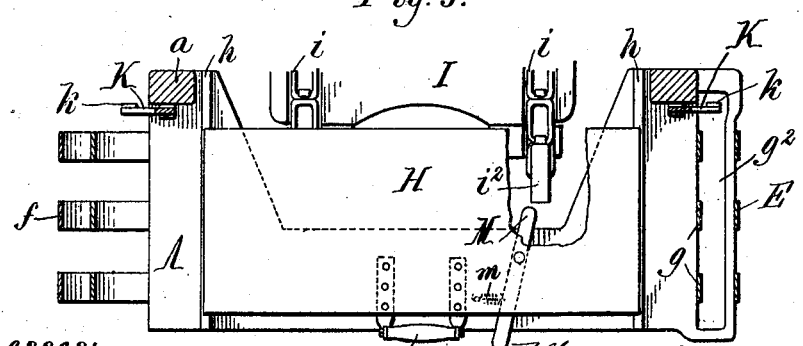

UNITED STATES PATENT OFFICE.

ALFRED W. FRENCH, OF PIQUA, OHIO.

OIL-CAKE-STRIPPING MACHINE.

No. 862,464.            Specification of Letters Patent.            Patented Aug. 6, 1907.

Application filed October 9, 1905. Serial No. 281,895.

*To all whom it may concern:*

Be it known that I, ALFRED W. FRENCH, a citizen of the United States, residing at Piqua, in the county of Miami and State of Ohio, have invented a new and useful Improvement in Oil-Cake-Stripping Machines, of which the following is a specification.

In the operation of expressing oil from oil-bearing meal and analogous oleaginous substances, the meal is molded into flat masses, or cakes for introduction into the press and the cakes are wrapped in press cloths to hold them intact when subjected to pressure to obtain the oil. In ordinary practice the press cloths envelop the opposite flat sides and two ends of the cakes, the ends of the cloths overlapping centrally at one side of the cakes. The cloths adhere very tenaciously to the cake after pressure and must be forcibly stripped off of the cakes.

This invention relates to machines for stripping the cloths from the oil cakes and has for its primary object to produce an efficient and desirable machine for expeditiously stripping the cloths completely from the cakes.

Other objects of the invention are to so construct the stripping rolls that the operative can quickly engage the ends of the cloths therewith, without danger of injury to himself; to provide the machine with desirable means for delivering the stripped cakes in quantity to the feed-table of the trimming machine which removes the soft marginal portion of the cake from which the oil has not been fully expressed; to provide means for indicating to the operative the proper instant at which to deposit the cakes on the feed-table of the trimming machine to prevent the cakes from being broken by the conveyer of the trimming machine.

Another object of the invention is to improve cake stripping machines in the respects hereinafter specified and set forth in the claims.

Figure 1:
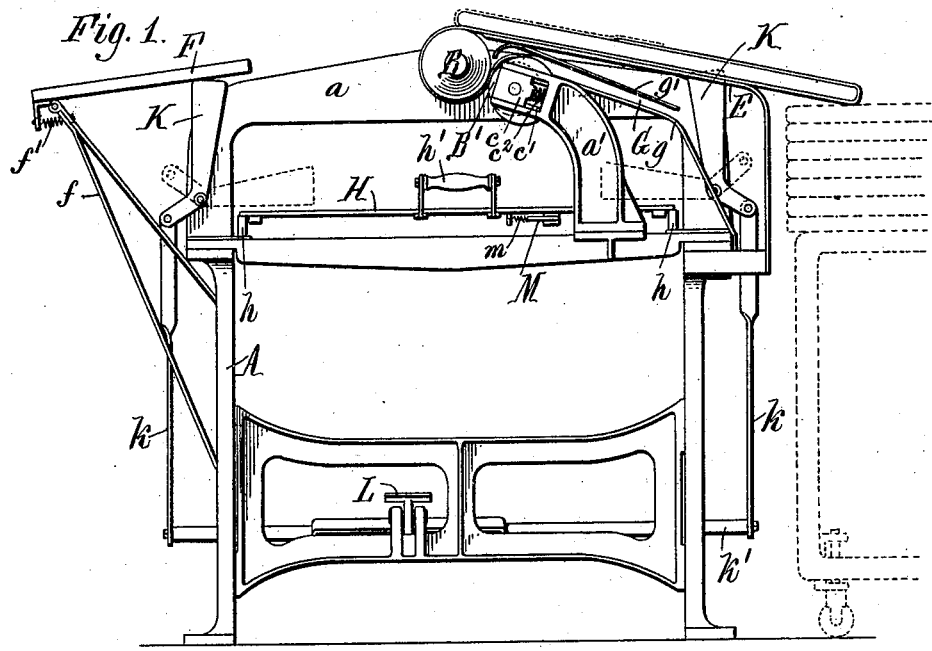
Figure 2:
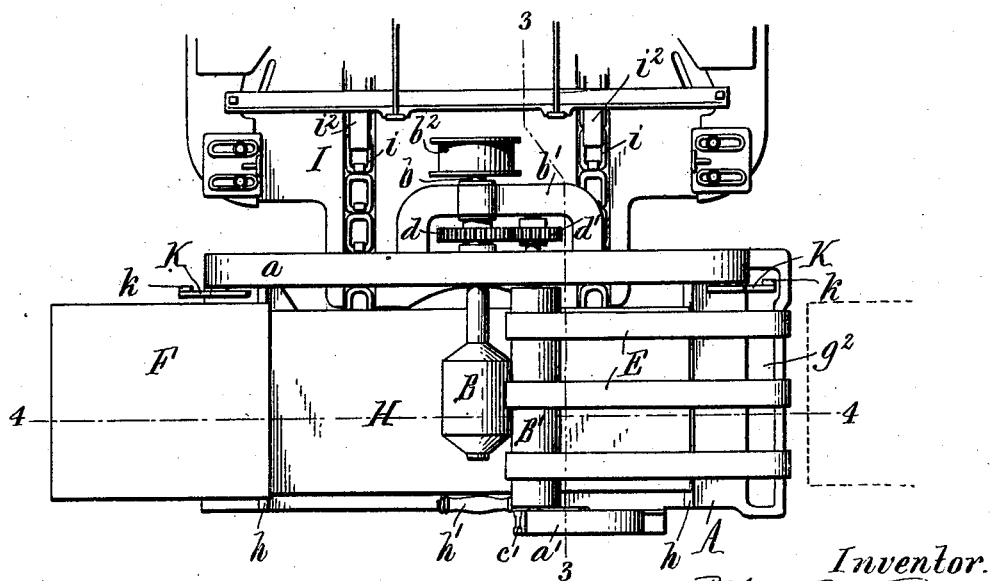

In the accompanying drawings, consisting of two sheets: Figure 1 is a front elevation of an oil cake stripping machine embodying the invention. Fig. 2 is a plan view thereof and of a portion of a cake trimming machine to which the cakes are delivered from the stripping machine. Fig. 3 is a transverse sectional elevation thereof in line 3—3, Fig. 2. Fig. 4 is a fragmentary longitudinal sectional elevation of the stripping machine in line 4—4, Fig. 2. Fig. 5 is a horizontal sectional plan of the stripping machine in line 5—5, Fig. 4, showing a portion of the conveyer of the trimming machine. Fig. 6 is a fragmentary plan view of the delivery slide and feed-table of the trimming machine, illustrating the operation of the feed-indicator. Fig. 7 is a sectional view of a cloth covered cake, illustrating another mode of wrapping.

Like letters of reference refer to like parts in the several figures.

The stripping machine, hereinafter described in detail, comprises, briefly stated, a pair of oppositely rotating stripping rolls between which one end of the cloth, which has been first loosened from the cake, is placed. The rolls grip and feed the cloth between them, thereby stripping it from the cake and moving the cake lengthwise first in one direction over the rolls and then in the opposite direction under the rolls as the cloth is detached from the under and upper sides of the cake. Beneath the rolls is a receiving table and discharge slide on which the cake drops when the cloth is completely detached and by which the cakes are discharged from the machine or are delivered to a conveyer for passing them through the cake trimming machine or carrying them to any other desired point.

A represents the frame of the machine which may be of any suitable construction. The frame shown in the drawings is provided at its rear with an upright bearing yoke $a$, and at its front with an upwardly projecting bearing arm $a'$.

B B' represent the stripping rolls which are arranged horizontally between the bearing yoke $a$ and arm $a'$. In the machine shown the roll B (hereinafter termed the stripping roll) is supported by a shaft or journal $b$ at its rear end, seated in bearings on the yoke and on a bracket $b'$ projecting therefrom. The shaft is provided at its rear end with a drive belt pulley $b^2$. The other roll B' (hereinafter termed the presser roll) has journals at opposite ends bearing in boxes $c$ which are movable in guides $c'$ in the bearing yoke and arm and are backed by suitable springs $c^2$, whereby the presser roll B' is held yieldingly against the other roll B. Intermeshing gear wheels $d$ $d'$ on the roll journals cause the positive rotation of the rolls in opposite directions at the same peripheral speed. The presser roll B' is preferably of the same diameter throughout while the stripping roll B is of largest diameter opposite the middle portion of the presser roll and is reduced in diameter at opposite sides of this enlarged portion, so that the cloths are gripped at the central portions only by the rolls. The reasons for this formation of the rolls will be explained later. The stripping rolls can be journaled, driven and pressed yieldingly together in any other suitable manner.

E represents a feed-board or table on which the cloth enveloped cakes are laid to be stripped and which, in the machine shown, consists of parallel spaced bars which rise from one end of the frame and extend laterally at an upward incline over the presser roll B', terminating near the top of the stripping roll. At the opposite side of the stripping roll is a return board or table F for supporting one end of the cake as it moves forwardly and rearwardly over and under the stripping roll in the stripping operation. The return board is preferably pivoted at its outer end to a suitable bracket $f$ rising from the frame and its free inner end is normally held up in the position shown in Fig. 1 to receive the cake from the stripping roll by suitable means, such as a spring $f'$ connecting the outer end of the board to its supporting bracket, which will permit the inner end of the board to lower under the weight of the cake.

G represents a discharge chute for the cloths below the feed-board, preferably formed by spaced bottom strips $g$ and spaced cover strips $g'$. The bottom strips are secured at their lower ends to the frame adjacent to the lower end of the feed-board bars and terminate at their upper ends near the presser roll, and the cover strips are attached to the underside of the feed board. The cloths are guided by the discharge chute from the stripping rolls to the end of the machine and fall through an opening $g^2$ in the frame between the bottom strips $g$ of the chute and the feed-board bars.

The stripping operation is as follows: The cakes with the cloths on are preferably brought to the stripping machine on a truck, indicated by dotted lines at the right in Fig. 1. The operative standing in front of the machine lays a cake on the feed-board E, as indicated in Fig. 1, loosens the end of the cloth nearest to the stripping rolls and holds the central portion of the loosened end against the stripping roll B, following it around with the hand until the cloth is gripped between the two stripping rolls. The hand is then removed and the rolls complete the stripping. The described shape of the stripping roll is desirable, because if the cloths are frayed or unevenly worn at the side edges, there would be a tendency, if the rolls gripped the side portion of the cloths, for the thicker side of the cloths to feed faster, thus making the cloths go crooked. When the cloths are gripped at the middle portion only, as they will be by the rolls described, they will feed straight. As the presser roll is yieldingly held toward the stripper roll, the rolls will grip and properly strip cloths of varying thicknesses. The variations in thicknesses of the press cloths are due to the different kinds used and also to the fact that some are worn or patched more than others. While the rolls constructed as described give the best general results, other forms of rolls could be used with more or less success and the invention, except for the specific claims to the rolls, is not limited to the particular form of the rolls described. As the rolls strip the cloth from the underside of the cake, the cake is drawn over the feed-board and stripping roll B, its forward end being supported by the return board F. When the cake passes over the stripping roll its weight will cause the return board to tilt downwardly and the cake will assume substantially the position shown in Fig. 4, with its rear end below the stripping roll. The continued operation of the rolls will strip the remaining end of the cloth from the upper side of the cake and move the cake in the opposite direction beneath the stripping roll. When the cake passes off of the return board and is fully detached from the cloth it will drop onto a cake support below the stripping rolls, as indicated by broken lines in Fig. 4. The tilting return-board lowers the cake gently on the cake support.

The cloths are most commonly wrapped about the cakes, as before explained, with the opposite ends overlapped at one side of the cake, and the machine is especially designed for stripping off this type of cloths, but the machine is also adapted to strip off cloths which are wrapped, as indicated in Fig. 7, with their two ends projecting from one end of the cake. When used with such cloths the end of the cloth at the lower side of the cake is loosened far enough to be engaged with the stripping rolls. The stripping operation is otherwise the same.

The cake support H, shown, consists of a slide which is movable forwardly and rearwardly of the machine on suitable horizontal tracks or guides $h$ on the frame and is provided at its front with an operating handle $h'$. When several cakes have accumulated in a pile on the slide H, as indicated in Fig. 3, the slide is shoved rearwardly over the feed table I of a cake trimming machine, which is located in rear of the stripping machine and a portion of which is shown in Figs. 2, 3 and 5. The trimming machine with which the stripping machine is intended to be used has a cake conveyer consisting of traveling chains $i$ provided with projecting feed dogs $i^2$ which engage the rear edges of the cakes and move them successively over the feed-table.

Two plates K K pivoted to the ends of the frame yoke $a$ are shown for moving the cakes off of the supporting and discharge slide. They normally stand in upright position, as indicated in Figs. 1 and 4, so that the pile of cakes can be moved between them over the feed-table of the trimming machine, as indicated by dotted lines in Fig. 3. The pivoted plates K K are connected, as by upright links $k$ and a connecting horizontal bar $k'$, to the rear end of a treadle L which is pivoted between its ends on the lower portion of the frame and extends to the front of the machine. When the pile of cakes is over the feed-table of the trimming machine the treadle is depressed, thereby swinging the discharge plates K K down in front of the pile of cakes, as indicated by broken lines in Fig. 1, so that when the discharge slide is again drawn forwardly the pile of cakes will be dragged off of the slide and deposited on the feed-table of the trimming machine.

In order to prevent breaking the cakes by dropping them on the dogs of the conveyer, the following means to indicate the position of the conveyer dogs are preferably employed:

M, Figs. 1, 5 and 6, represents an indicator lever pivoted on the underside of the discharge slide with its front end projecting into view in front of the slide. A suitable spring $m$ connecting the lever to the slide normally holds the rear end of the lever in line with the path of movement of the feed dogs $i^2$. In discharging the cakes, the operative shoves the discharge slide rearwardly and waits until the indicator lever is deflected by the engagement of one of the feed dogs therewith and then withdraws the slide to deposit the cakes on the feed-table of the trimming machine. The relation of the indicator lever to the feed dogs is such that if the slide is withdrawn directly after the deflection of the lever the cakes will be properly deposited on the feed-table in proper feeding position in front of a pair of feed dogs.

The discharging means described are desirable for delivering the piled cakes to the trimming machine, or to any other table or supporting surface or conveyer, but other means for removing the stripped cakes from the stripping machine could be employed in connection with the stripping device described, or if preferred, the discharging means could be omitted from the machine and the stripped cakes removed by hand. Furthermore, while the indicator device is a desirable adjunct to the discharge means, it is not absolutely essential to the operation of the latter.

I claim as my invention:

1. In a cake stripping-machine, the combination of a pair of stripping rolls, means for positively driving said rolls whereby they grip the cloth, feed it between them and strip it from the cake, and a support beneath said stripping rolls on which the stripped cake is deposited, substantially as set forth.

2. In a cake stripping machine, the combination of a pair of stripping rolls, means for positively driving said rolls whereby they grip the cloth, feed it between them and strip it from the cake, a support beneath said stripping rolls on which the stripped cake is deposited, and means for holding the cloths off of the stripped cakes and discharging them beyond said cake support, substantially as set forth.

3. In a cake stripping machine, the combination of a support for the cloth covered cake, a pair of stripping rolls, means for positively driving said rolls whereby they grip the cloth, feed it between them, strip it from the cake and move the cake over one of said rolls, and a support beneath said stripping rolls on which the stripped cake is deposited, substantially as set forth.

4. In a cake stripping machine, the combination of a pair of stripping rolls, a feed table at one side of said stripping rolls for supporting the cloth covered cake, a support beneath said stripping rolls for receiving the stripped cake, and means for driving said stripping rolls whereby they grip the cloth, feed it between them and strip it from the cake, substantially as set forth.

5. In a cake stripping machine, the combination of means for stripping the cloths from the cakes, a feed board for supporting the cloth-covered cakes, a support for the stripped cakes beneath said stripping means on which the cakes are deposited, and a discharge chute for the cloths between said feed board and the cake support, substantially as set forth.

6. In a cake stripping machine, the combination of a pair of stripping rolls, means for driving said rolls whereby they grip and feed the cloth between them, a feed board for supporting the cloth-covered cakes, a support for the stripped cakes beneath said stripping rolls on which the cakes are deposited, and a discharge chute for the cloths between the feed board and the cake support, substantially as set forth.

7. In a cake stripping machine, the combination of means for stripping the cloths from the cakes, a feed board at one side of said stripping means for supporting the cloth-covered cakes, a support for the cakes at the opposite side of said stripping means, a support for the stripped cakes beneath said stripping means on which the cakes are deposited, and a discharge chute for the cloths between the feed board and the cake support, substantially as set forth.

8. In a cake stripping machine, the combination of means for stripping the cloths from the cakes, a support for the stripped cakes beneath said stripping means on which the cakes are deposited, and a return board which coöperates with the stripping means to support the cakes during the stripping operation and tilts to deposit the cakes on said cake support, substantially as set forth.

9. In a cake stripping machine, the combination of means for stripping the cloths from the cakes, a support for the stripped cakes beneath said stripping means on which the cakes are piled, and which is movable to discharge the stripped cakes from the machine, substantially as set forth.

10. In a cake stripping machine, the combination of means for stripping the cloths from the cakes, a sliding support beneath said stripping means on which the stripped cakes are deposited, and which is movable over a supporting surface, and means for dragging the cakes off of said sliding support, substantially as set forth.

11. In a cake stripping machine, the combination of means for stripping the cloths from the cakes, a sliding support beneath said stripping means on which the stripped cakes are deposited, and which is movable over a supporting surface, and movable plates between which said sliding support is movable and which are adapted to be moved over said sliding support to drag the cakes off of the same, substantially as set forth.

12. In a cake stripping machine, the combination of means for stripping the cloths from the cakes, a support beneath said stripping means on which the stripped cakes are deposited and which is movable to deposit the cakes on a conveyer, and means coöperating with said conveyer to indicate the position of the conveyer whereby the cakes can be deposited at the proper time on the conveyer, substantially as set forth.

13. In a cake stripping machine, a pair of rolls for stripping the cloths from the cakes, one of said rolls being shaped to engage the cloths between their edges only, substantially as set forth.

14. In a cake stripping machine, a pair of rolls for stripping the cloths from the cakes, one of said rolls being of substantially uniform diameter throughout and the other being of largest diameter substantially opposite the central portion of the first roll, substantially as set forth.

15. In a cake stripping machine, a pair of rolls for stripping the cloths from the cakes, one of said rolls being shaped to engage the cloths between their edges only, and means for pressing one of said rolls yieldingly toward the other, substantially as set forth.

Witness my hand, this 3d day of September, 1905.

ALFRED W. FRENCH.

Witnesses:
J. F. CONE.
ROSE EBLER.